Aug. 16, 1932.   B. T. ANDREN   1,872,384
METHOD OF STRAIGHTENING PIPE
Filed April 19, 1929   2 Sheets-Sheet 1

INVENTOR.
Birger T. Andren
BY
ATTORNEY.

Aug. 16, 1932.    B. T. ANDREN    1,872,384
METHOD OF STRAIGHTENING PIPE
Filed April 19, 1929    2 Sheets-Sheet 2

INVENTOR.
Birger T. Andren
BY
ATTORNEY.

Patented Aug. 16, 1932

1,872,384

UNITED STATES PATENT OFFICE

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK

METHOD OF STRAIGHTENING PIPE

Application filed April 19, 1929. Serial No. 356,517.

This invention relates to a method of straightening pipe and is particularly applicable as a step in the manufacture of electrically welded pipe in which manufacture a flat sheet of metal is converted into tubular form and electrically welded on the longitudinal meeting line of the side edges into an integral section of pipe.

In the manufacture of pipe, it has been found that the heating of the pipe on one side thereof during the electric welding process and the cooling and contracting of the welding metal cause certain undesirable irregularities to be set up in the pipe section which bend the pipe with the welded side thereof on the smaller radius.

The object of this invention is to provide a simple, efficient, and economical method for removing such undesirable irregularities which may be set up in the pipe during the manufacture thereof.

Another object of the invention is to provide a novel method for straightening the pipe after the welding thereof.

The accompanying drawings illustrate an application of the invention in which the views are as follows.

The pipe 1 is preferably formed from sheet or plate metal of extreme length by rolling, pressing, or otherwise converting the plates into tubular blanks having the side edges thereof meeting in welding relation on a longitudinal line of the blank. The edges are preferably electrically welded together by means of an electric arc or by means of a current directed across from one edge to the other or by any other suitable method of electric welding.

Figure 1:
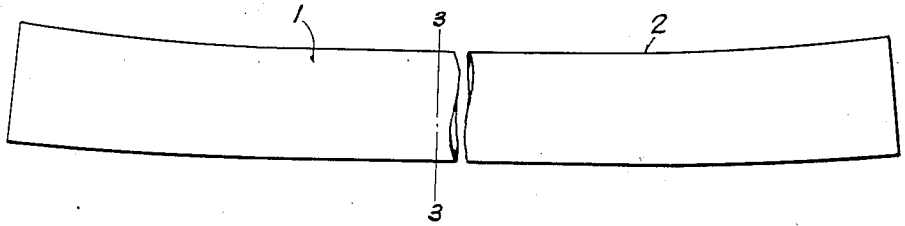
Figure 1 is a side elevation of a welded pipe section prior to the application of the present invention thereto.
Figure 2:
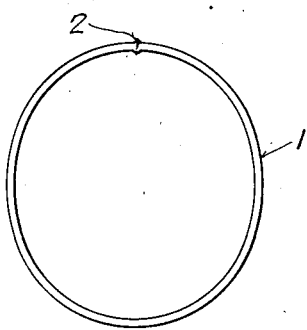
Fig. 2 is an end view of the welded pipe section.
Figure 3:
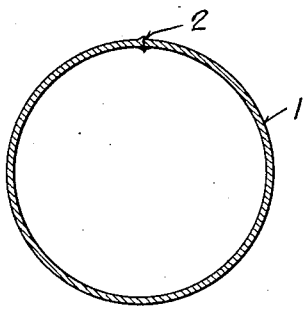
Fig. 3 is a transverse section on line 3—3 of Fig. 1.
Figure 4:
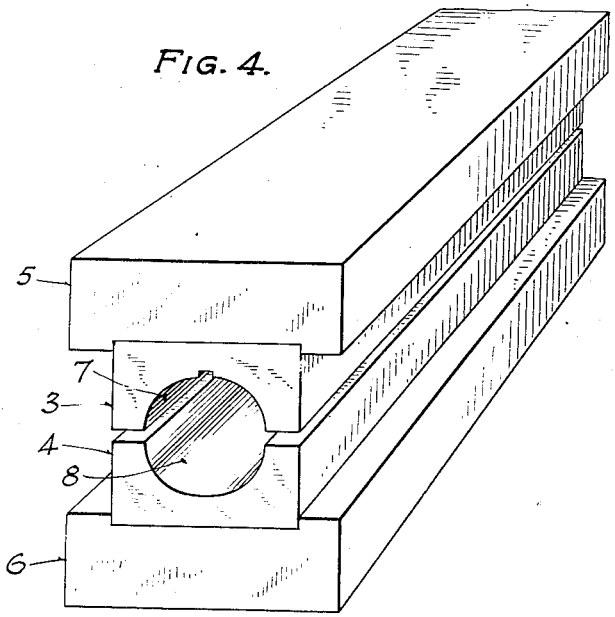
Fig. 4 is a perspective view of the apparatus for carrying out the invention.

The electric welding operation intensely heats the metal on one side of the pipe and, when this heated metal cools and contracts, it tends to bow the pipe in a direction in which the weld 2 is on the smaller radius of the bow, as shown in Figure 1. This tendency is so strong that in many cases the pipe is given an oval configuration with the weld on the major axis of the oval. This oval configuration of the pipe is more pronounced at the ends as shown in Fig. 2 than in the center of the pipe as shown in Fig. 3.

In the manufacture of large diameter pipe for oil and gas pipe lines, it is highly desirable to have pipe which is substantially straight and of uniform circular cross-section. With this end in view, it has been suggested that the welded pipe be passed through a set of straightening rolls; but this method has many difficulties since it does not adequately remove the oval configuration of the pipe and therefore does not straighten the same sufficiently.

Figure 7:
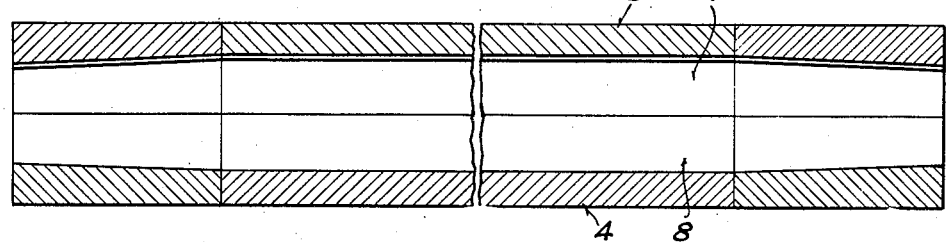
Fig. 7 is a vertical central longitudinal section through the dies.

The present invention overcomes these difficulties by applying opposing lateral or radial pressures to the pipe by means of a plurality of co-operating die members 3 and 4. These die members are preferably of sufficient length to receive the entire pipe section, and may be made up of sections as shown in Fig. 7 or of integral members as shown in the modification in Fig. 8.

The die members are supported on the upper and lower jaws 5 and 6, respectively, of a powerful press and are thereby moved relatively toward each other to press the pipe section therebetween. The die members have co-operating recesses 7 and 8, respectively, extending longitudinally thereof for receiving the pipe section.

Figure 5:
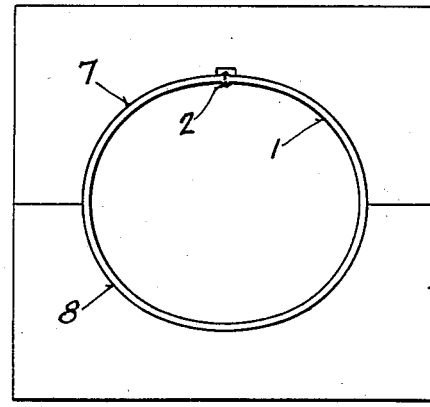
Fig. 5 is an end view of the pipe and closed die members.
Figure 6:
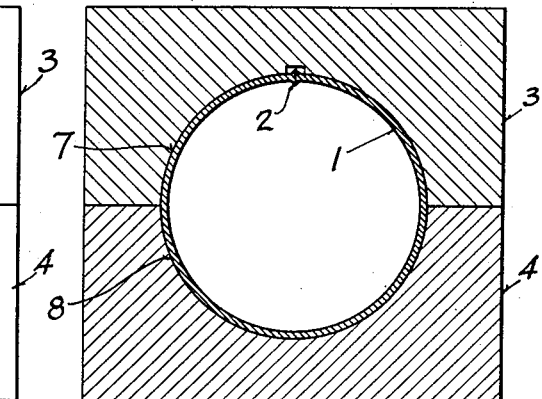
Fig. 6 is a central transverse section through the pipe and closed die members.

These recesses are complementary and of less total cross-sectional area than the cross-sectional area of the pipe and are preferably of varying cross-sectional configuration depending upon the irregularities to be removed from the pipe section. Thus the recess 7—8 defined by the dies has an oval configuration which is more pronounced at the ends than in the center, as shown in Figures 5 and 6.

The pipe section 1 is placed between the dies with the weld 2 registering with an auxiliary recess 9 in the upper die 3, the long axis of the oval pipe section being vertical and at right angles to the long axis of the recess 7—8 in the die members.

The die members are then pressed relatively towards each other, first straightening the pipe section and then squeezing the same to flow the metal radially and permanently set the same and thereby retain the pipe in its straight and uniform configuration. The oval form of the recess 7—8 counteracts for the oval form of the pipe so that when the pipe is released from the die members the section will be substantially cylindrical.

Figure 8:
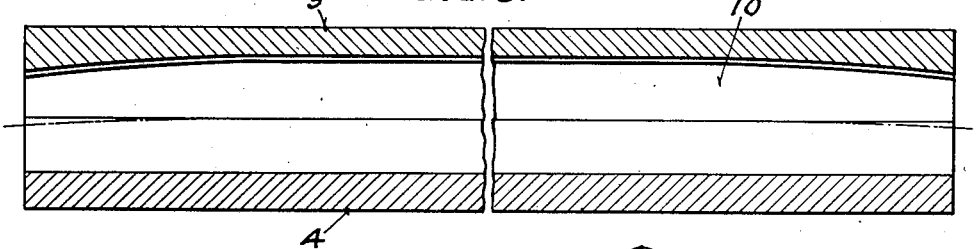
Fig. 8 is a vertical central longitudinal section through a modified form of dies.
Figure 9:
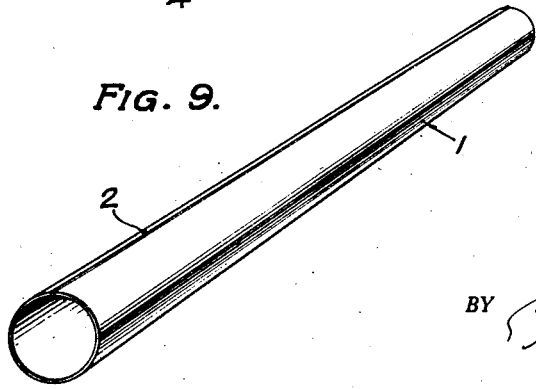
Fig. 9 is a perspective view of a straightened pipe section.

The flowing of the metal thickens the same substantially and with certain thicknesses of sheet metal this increase in thickness may amount to as high as five thousandths of an inch. The operation also increases the length of the pipe depending upon the flow of metal obtained.

Where the bow in the pipe is extreme, it may be advisable to employ dies shaped as shown in Fig. 8 with the recess 10 bowed in its length to counteract the bow in the pipe. However, since the bow is only caused by the contraction of the welded side of the pipe, it is ordinarily sufficient to employ dies having a substantially straight recess of varying configuration of the shape shown in Fig. 7 in which the welded side of the pipe is actually bowed in the opposite direction thereby counteracting the bow of the weld.

The recess 7—8 may be of substantially circular cross-section in the central portion and only the ends may be of oval contour since the ends of the pipe are the portions which have the greatest irregularities.

The invention provides a method which simultaneously straightens and makes the pipe substantially uniform in cross-section, all in one single operation requiring only a few seconds of time.

I claim:

1. The method of straightening a metal pipe section having a single longitudinal electrically welded seam the cooling of which from the welding temperature has deformed the pipe from the desired cylindric shape, the steps comprising applying pressure simultaneously to the entire length of the pipe section transversely thereof and in the axial plane bisecting the welded seam to deform the pipe oppositely to the existing deformities, and thereafter applying additional transverse pressure sufficient to flow the metal of the section radially while maintained in its oppositely deformed condition, the deforming and upsetting pressures being of such order that the section thereby assumes substantially true cylindric form.

2. The method of straightening a pipe section having a single longitudinal electrically welded seam the cooling of which from the welding temperature has deformed the pipe from the desired cylindric shape to the extent that the pipe is bowed longitudinally and is of a cross-section which progressively varies from substantially a circle at the mid-point to ovals at the ends with the major axes of the ovals in the axial plane that bisects the welded seam, the steps comprising die-pressing the full length of the section to apply transverse pressure thereto in the axial plane bisecting the welded seam to straighten the full length of the section and to flatten the oval sections until their major axes are substantially normal to the axial plane that bisects the welded seam, and thereafter continuing the application of transverse pressure to flow the metal of the pipe radially to set the same while the section is maintained longitudinally straight and in its modified oval cross-section, whereby upon release from the dies the pipe section assumes a true cylindric form.

3. The method of straightening and sizing pipe made from tubular blanks and electrically welded along a single longitudinal seam, which comprises providing movable complementary dies of predetermined size for making the pipe of uniform cross-section, arranging the pipe with the electrically welded seam in a diametric plane in line with the line of movement of the dies, applying pressure to the pipe to straighten it, and thereafter applying more pressure and confining the pipe except at the seam to flow the metal and give it a set at a predetermined uniform size.

4. The method of straightening and sizing pipe made from tubular blanks and electrically welded along a single longitudinal seam, which comprises providing movable complementary dies of predetermined size for making the pipe of uniform cross-section, arranging the pipe with the electrically welded seam in a diametric plane in alignment with the line of movement of the dies, applying pressure to the pipe to straighten it, and thereafter applying more pressure and confining the pipe to flow the metal and give it a set at a predetermined uniform size.

In testimony whereof I have signed my name at Milwaukee, Wisconsin, this 16th day of April, 1929.

BIRGER T. ANDREN.